(No Model.)
A. M. RIHBANY.
BICYCLE SUPPORT.
No. 532,287. Patented Jan. 8, 1895.
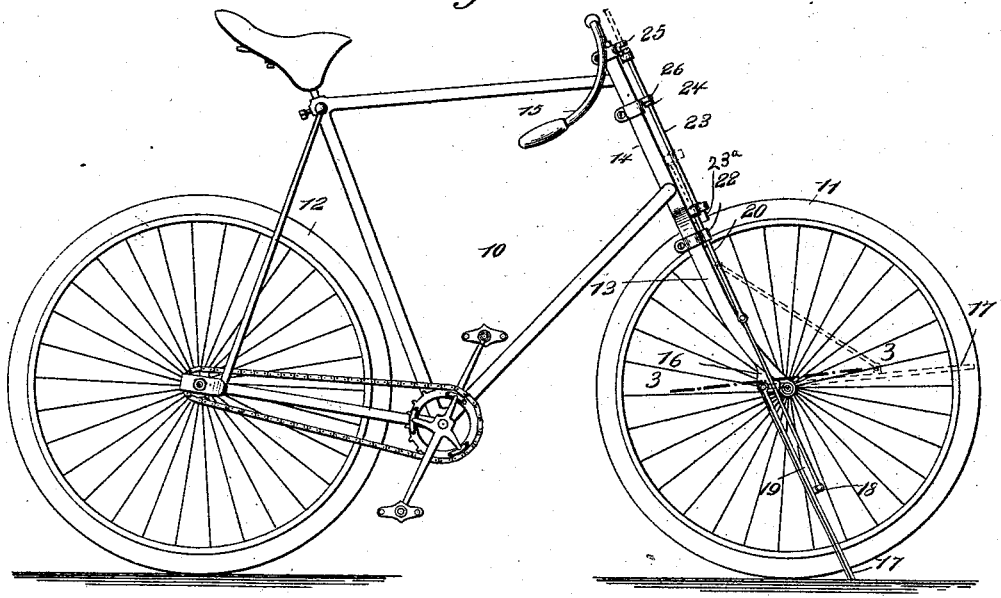
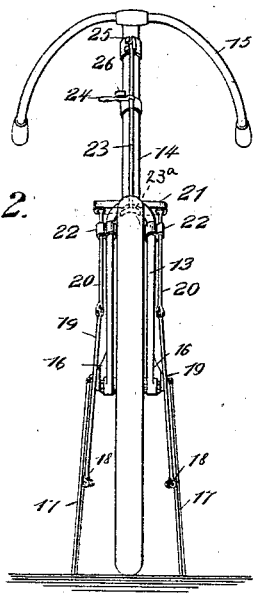
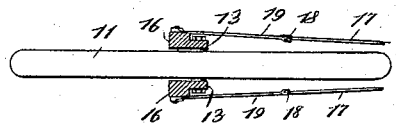
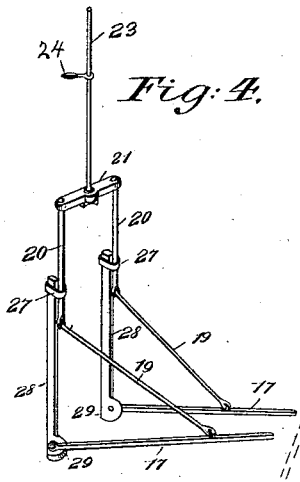
WITNESSES:
John A. Rennie
W. B. Hutchinson
INVENTOR
A. M. Rihbany
BY
Munn & Co.
ATTORNEYS.

UNITED STATES PATENT OFFICE.

ABRAHAM M. RIHBANY, OF WAUSEON, OHIO.

BICYCLE-SUPPORT.

SPECIFICATION forming part of Letters Patent No. 532,287, dated January 8, 1895.

Application filed September 6, 1894. Serial No. 522,277. (No model.)

*To all whom it may concern:*

Be it known that I, ABRAHAM M. RIHBANY, of Wauseon, in the county of Fulton and State of Ohio, have invented a new and Improved Bicycle-Support, of which the following is a full, clear, and exact description.

My invention relates to improvements in bicycles and particularly to that class of devices which are adapted to be applied to bicycles so as to hold them in a vertical position.

The object of my invention is to produce a light, cheap, and easily operated support of this character which may be applied to a bicycle when the latter is built or may be applied to any ordinary bicycle after it is completed, and which may be conveniently operated so as to throw the legs of the support into contact with the ground so as to hold the machine in an upright position, or may be arranged so as to hold the legs above the ground and permit the bicycle to be ridden and driven in the usual way.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a safety bicycle provided with my improved support, the legs of which are shown in contact with the ground. Fig. 2 is a front elevation of the machine. Fig. 3 is a sectional plan on the line 3—3 of Fig. 1. Fig. 4 is a detail perspective view of the support as adapted for attachment to a completed machine; and Fig. 5 is a detail sectional view, showing the arrangement for spreading the legs of the support.

The bicycle 10 may be of any usual construction and it has the customary front and rear wheels 11 and 12, the usual steering fork 13 and head 14, also the usual handle bars 15 which are connected with the steering fork. The prongs of the steering fork are at their lower ends provided with rearwardly extending lugs 16, in case the attachment is applied to the machine when it is built, and to these lugs are pivoted the swinging legs 17 which are long enough to extend to the ground and straddle the front wheel. To these legs are pivoted, as shown at 18, connecting rods 19 which are also pivoted to the prongs 20 of a fork 21, which slides up and down on the head 14 of the machine, and to guide the fork the prongs 20 are arranged to slide in guide clips 22 which are secured to the steering fork 13. The fork 21 is provided with a shank 23 which extends upward on the front of the head 14 and the shank moves in a suitable guide 25 at the top of the head 14, and the shank is provided with a handle 24 by means of which it may be raised or lowered. The guide 25 is slotted laterally to receive the handle, so that when the handle and the shank are raised the handle may be turned into the slot and thus lock the support in its elevated position, and the handle is also adapted to be locked beneath a lug 26 on the head 14 when the support is in its lowest position and the legs 17 are on the ground. The shank 23 besides working the fork 21, as described, is also provided at its lower end with a shoe $23^a$ which, when the shank is depressed and the support forced to the ground, impinges on the tire of the wheel 11 and thus serves as a brake which prevents the turning of the wheel.

When the handle 24 is pushed down it pushes down the fork 21 and the connecting rods 19 which, acting on the legs 17, force them to the ground and then, by turning the handle 24 to one side and locking it beneath the lug 26, the legs are held in position and the bicycle is held upright. It will of course be seen that by lifting the handle 24 the connecting rods 19 will pull up on the legs 17 and lift them to a horizontal position, as shown by dotted lines in Fig. 1, and when in this position the bicycle may be used as freely as if it had no support attached to it.

When the device is to be applied to an old machine or one already completed, it is necessary to provide a substitute for the lugs 16, and in this case posts 28 are used which are fastened to the fork 13 in any convenient way, and these have guide loops 27 for the prongs 20 of the forks 21, see Fig. 4, and the posts are at their lower ends formed into inclined lugs 29 like the lugs 16, the lugs being outwardly inclined, as shown clearly in Fig. 5, and the legs 17 are pivoted on these lugs, so that when turned one of them will be spread, as shown by dotted lines in Fig. 5. This device, shown in Figs. 4 and 5, is operated exactly as already described, the only difference between this and the device as shown in Figs. 1 to 3 being in the manner of supporting the lugs to which the legs 17 are pivoted.

Having thus described my invention, I claim as new and desire to secure by Letters Patent—

1. The combination with a bicycle provided with an upper slotted guide 25 on its front, and a lug 26 therebelow and a lower guide, of a single rod sliding through said guides and carrying a laterally projecting handle adapted to be swung horizontally into the slot of said guide 25, or under the lug 26, a fork secured to the lower end of the rod and straddling the front wheel, legs pivoted adjacent to the axle of the front wheel to swing down to the ground, and links pivotally connecting the lower end of the fork with said legs between the ends thereof, substantially as described.

2. The combination, with the bicycle, of the shank held to slide on the head of the bicycle, the support worked by the shank, and the shoe at the lower end of the shank to impinge on the bicycle wheel, substantially as described.

ABRAHAM M. RIHBANY.

Witnesses:
 H. C. BERRY,
 W. C. WILLIAMS.